Patented Aug. 14, 1945

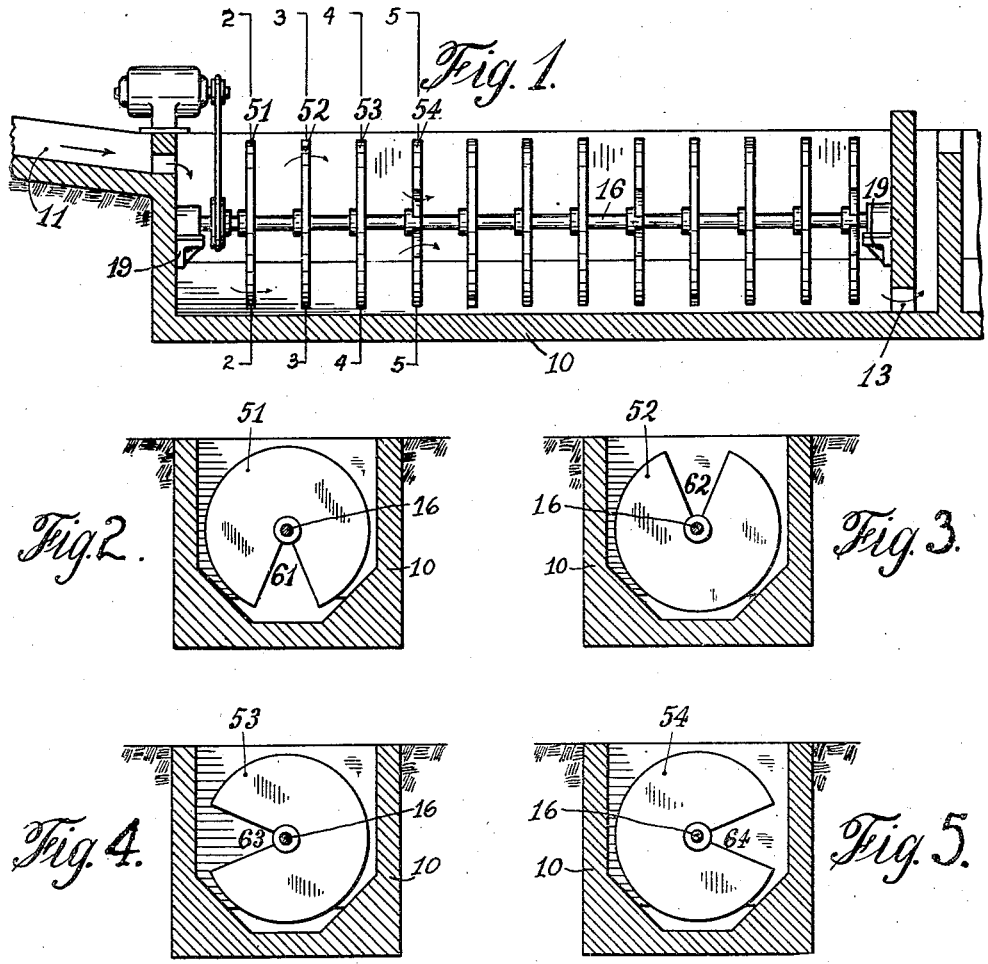

2,382,605

UNITED STATES PATENT OFFICE 2,382,605

APPARATUS FOR EFFECTING CLARIFICATION OF TURBULENT LIQUID BY FLOCCULATION

Ralph B. Carter, Jr., West Englewood, N. J., assignor to Ralph B. Carter Company, Hackensack, N. J., a corporation of New York Application December 7, 1940, Serial No. 369,080

2 Claims. (Cl. 259—9)

This invention relates to an apparatus for effecting clarification of turbulent liquid by flocculation followed by sedimentation or filtration or both.

The steps of mixing with a coagulant, as also flocculation and clarification by sedimentation, and filtration are well known.

The object of this invention is to obtain a more effective flocculation with a more positive control of the flow paths, and the direction by positive forces the flow paths of the liquid during the major portion of the flocculation period to obtain maximum collision of the floc particles allowing them to form flocs of uniformly large and quickly settling size, through mass attraction.

The flocculation step is preceded by the action of a dosing agent into the liquid undergoing treatment and the dispersing of the chemical throughout the liquid for the realizing of the maximum floc-producing or initiating action thereof preparatory to the subjecting of the thus chemically dosed and floc-bearing liquid to gentle movements conducive to flocculation or floc conditioning to make flocs large and readily settable.

The invention provides for constricted mixing zones alternating with expanded free flowing zones, whereby after intimate contact of the chemically dosed liquid a free-flowing of the liquid is carried out to enable flocculation to take place.

The improved condition provides for a new combination of a gentle horizontal swirling action with either successively interrupted zones of gentle turbulence and quiescence, or horizontal vortical opposed conical flows throughout 360° and to provide continuously successive zones of quiescence and gentle turbulence. The formed flocs alternately settle and are swept up due to changing velocities, under continually changing flow paths, for maximum collision.

In one embodiment of the invention, the flow is from a central location to a circumferential, and so on, and in one of the other embodiments, the flow continually varies circumferentially of the axis of rotation, screw fashion.

The invention will be more fully described hereinafter, shown in the drawing, and finally set forth in the claims.

In the accompanying drawing,

Fig. 1 is a side sectional view of the container with the controller;

Fig. 2 is a section of Fig. 1 on line 2—2;

Fig. 3 is a section of Fig. 1 on line 3—3;

Fig. 4 is a section of Fig. 1 on line 4—4; and

Fig. 5 is a section of Fig. 1 on line 5—5.

Referring to the drawing, a tank or container is shown in Fig. 1, with an inlet 11 and an outlet 13, said inlet and outlet may or may not be at opposite ends or sides of the tank or container. A shaft 16, is supported by bearings on pedestals 19. Attached to the shaft 16 are control plates of suitable form or shape, a few of which are shown in Figs. 2, 3, 4, and 5, as plates 51, 52, 53, 54, etc. These plates due to their position on the shaft successively and alternately interrupt the general flow path through the tank 10 and cause constantly changing flow paths of an infinite number of intricate directions and velocities at the same time creating successively and alternately zones of quiescence and gentle turbulence immediately before and in back of the slowly rotating control plates. Under this condition the control plates attached to one shaft may overlap the control plates attached to other shaft, or they may be staggered in relation to the control plates on the other shaft. The particular value of this last method is immediately apparent in the constantly changing complexity of flow paths obtainable by varying the type and shape of the control plates providing a most complete and effective method of mixing without destructive agitation for maximum floc contact and amassment. A further advantage of this last method is a material decrease in power requirements for proper flocculation due to the elimination of the paddles which require substantial power to force them through the liquid. The power requirements of this last described method are extremely small as power is required only to overcome the inefficiency of the bearings used on the shafting, the slight thrust against these bearings caused by the flow against the control plate and by the extremely small amount of friction losses incurred by the control plates cutting through the liquid.

From one end to the other of the container, there is an undulating movement, the nodes of which are determined by the spacing of the controllers, and relative spaces of which are determined by the shapes of the controllers.

In Fig. 2, is shown a disc 51 with a cut 61, at its lower portion. In Fig. 3 is a like disc 52, with a cutout 62 at its upper portion. Fig. 4 is a like disc 53 with its cutout 63 at one side and the disc 54 has its cutout 64 at its other side, and the successive discs thereafter have the cutouts arranged at various angles. As the fluid passes directly through the cutouts its velocity is increased, but as it entered the spaces between the two adjacent discs, the fluid partakes of a large number of gentle eddy currents which assist in agglomerating the flocs.

From the foregoing it will be seen that the omission of the paddles brought about the omission of the breaking up of the flocs, also that by omitting the paddles and the stationary baffles, a constantly changing general longitudinal flow path in which multitudinous eddy currents are set up in the general longitudinal direction whereby an excellent medium of floc formation is created.

Expressed in another way the general longitudinal flow through the flocculation container or tank from entrance to exit passages is successively interrupted by the rotating controllers or baffles and in the main is allowed only to flow through the open segment or segments of the baffles, causing through this open section increased velocity and multitudinous eddy currents throughout its 360 degrees of travel around the cross sectional area of the filter tank. No two open baffle segments of adjacent baffles are placed in the same line, thereby effectively preventing any possibility of a straight short circuiting flow even though this flow might at the same time be a rotating flow.

As described there has been provided a combination of a series of plate controllers disposed in planes transversely to said shaft and rotatable therewith, and having aligned peripheral portions each spaced from the walls of the container to provide passages, and each plate controller having a cut out forming a passage for the flow of the material, said cutouts being misaligned with each other from controller to controller, said controllers being spaced from each other along said shaft without positive agitative means between said controllers, said controllers being so arranged that the material flows over the peripheral portion of one controller to the shaft portion of the cutout of the next adjacent controller, and from that shaft portion of the cutout to the peripheral portion of the next controller, whereby the material flows over the peripheral portions of the controllers and partakes of a continuous unbroken stream of spiral formation as the material passes from the inlet to the outlet through the successive cutouts.

Another important feature of this form of the invention is an ability to gradually decrease the momentary velocity through the open segments of the various baffles as the liquid flows in its general horizontal path from the entrance to the exit. It has long been recognized that as amassment occurs and the delicate flocs become larger an impact force of the same size is much more liable to break up the larger flocs than the smaller flocs. Prior to this invention attempts have been made to create this floc destruction of the larger flocs by decreasing paddle speeds or velocities in the later stages of flocculation near the exit of the flocculation tank, container or containers. This method of preventing destruction of the larger newly formed flocs is as covered by Patent No. 1,605,596, and known as the Langelier patent.

In my invention these velocities may be effectively and most advantageously gradually decreased as the general longitudinal or horizontal flow approaches the exit of the container or tank by increasing the size of the open section of the baffle segments. My invention is different from the above mentioned patent in that the flow through the tank is at all times in a general horizontal flow at the same speed with positive control of velocities at any point throughout the tank and not at different speeds as is clearly indicated in the Langelier patent, the controlled velocities being constantly created at various continuously changing points throughout the entire 360 degree cross sectional area of the tank.

I have described an embodiment of the invention, but changes may be made without departing from the spirit of the invention as defined in the appended claims.

What I claim is:

1. In a flocculating mechanism having a container for the material to be treated with an inlet and an outlet, and a shaft longitudinally disposed with respect to the flow of material from the inlet to the outlet, the combination therewith of a series of plate controllers disposed in planes transversely to said shaft and rotatable therewith, and having aligned peripheral portions each spaced from the walls of the container to provide passages, and each plate controller having a cutout forming a passage for the flow of the material, said cutouts being misaligned with each other from controller to controller, said controllers being spaced from each other along said shaft without positive agitative means between said controllers, said controllers being so arranged that the material flows over the peripheral portion of one controller to the shaft portion of the cutout of the next adjacent controller, and from that shaft portion of the cutout to the peripheral portion of the next controller, whereby the material flows over the peripheral portions of the controllers and partakes of a continuous unbroken stream of spiral formation as the material passes from the inlet to the outlet through the successive cutouts.

2. In a flocculating mechanism having a container for the material to be treated with an inlet and outlet and a shaft longitudinally disposed with respect to the flow of material from the inlet to the outlet, the combination therewith of a series of plate controllers disposed in planes transversely to said shaft and rotatable therewith and having aligned peripheral portions each spaced from the walls of the container to provide passages, and, each plate controller having a cutout forming a passage for the flow, said cutouts being misaligned with each other from controller to controller, said controllers being spaced from each other along said shaft without positive agitative means between said planes, said controllers being so arranged that the material flows over the peripheral portion of one controller to the shaft portion of the cutout of the next adjacent controller and from the shaft portion of said cutout to the peripheral portion of the next controller, said cutouts increasing in size from the inlet to the outlet for decreasing the velocity of the material passing therethrough from the inlet toward the outlet of the tank, whereby the material flows over the peripheral portions of the controllers and partakes of a continuous unbroken stream of spiral formation as the material passes from the inlet to the outlet through the succession cutouts.

RALPH B. CARTER, JR.